April 22, 1924.

W. E. HOSCH 1,490,974

FABRIC MEASURING MACHINE

Filed June 21, 1920    2 Sheets-Sheet 1

Inventor:
Walter E. Hosch, Deceased.
Annie Mae Hosch
Ad'm'x.

by Elliott Ammen
his Att'ys.

April 22, 1924.
W. E. HOSCH
FABRIC MEASURING MACHINE
Filed June 21, 1920      2 Sheets-Sheet 2
1,490,974
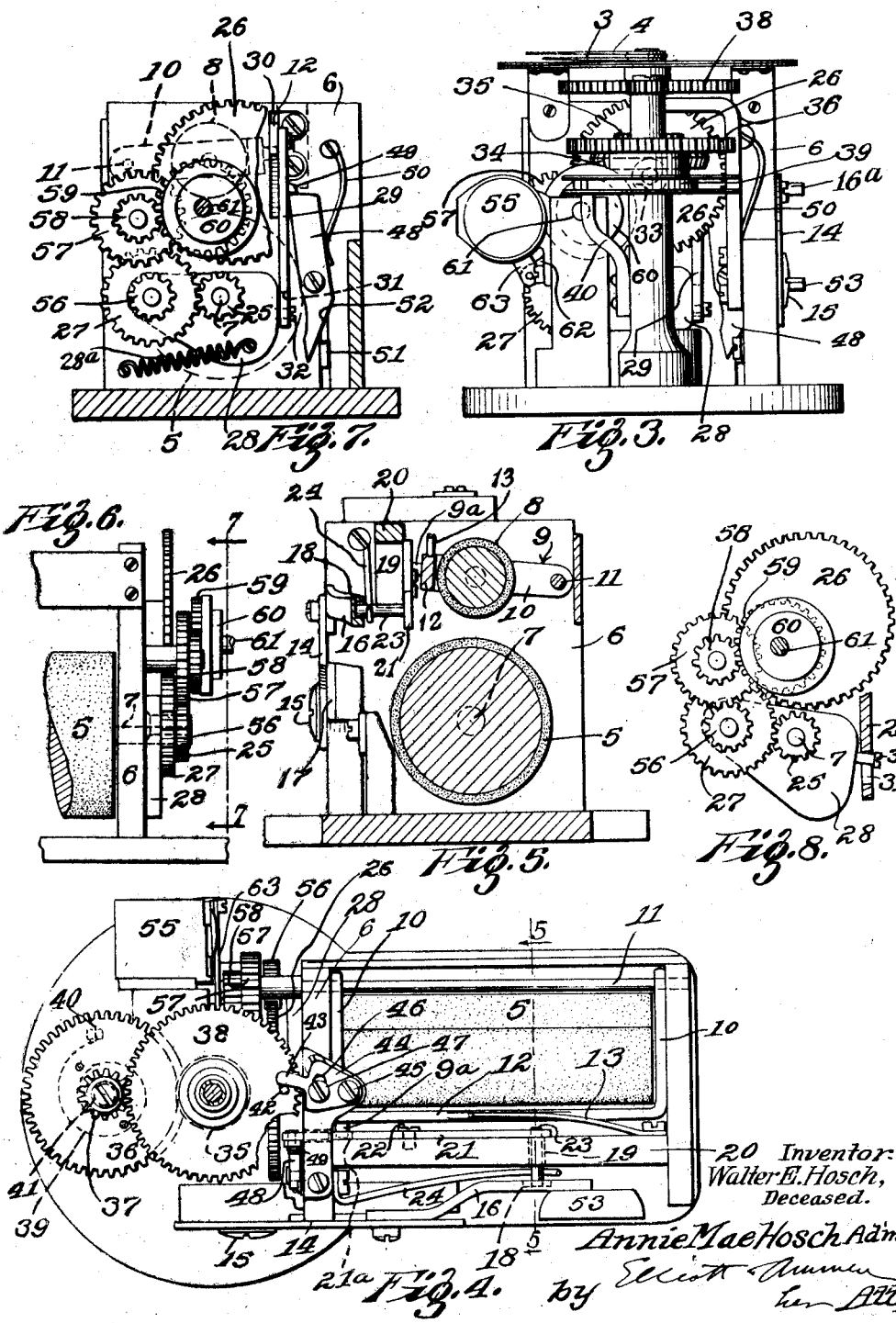

Patented Apr. 22, 1924.

1,490,974

UNITED STATES PATENT OFFICE.

WALTER E. HOSCH, DECEASED, LATE OF ST. LOUIS, MISSOURI; BY ANNIE MAE HOSCH, ADMINISTRATRIX, OF ST. LOUIS, MISSOURI, ASSIGNOR TO THE MEASUREGRAPH COMPANY, OF ST. LOUIS, MISSOURI, A CORPORATION OF MISSOURI.

FABRIC-MEASURING MACHINE.

Application filed June 21, 1920. Serial No. 390,594.

*To all whom it may concern:*

Be it known that WALTER E. HOSCH, deceased, who in his lifetime was a citizen of the United States, residing in the city of St. Louis and State of Missouri, did invent new and useful Improvements in Fabric-Measuring Machines, of which the following is a specification.

The invention relates to fabric measuring or cost computing machines, such as used in measuring the length of piece goods sold at retail. These machines usually include in their construction a measuring roller with which co-operates a presser roller that presses the fabric against the measuring roller. As the fabric is pulled past the measuring roller it rotates it and advances the indicating mechanism to indicate the length or cost of the piece measured. After taking a measurement the indicating mechanism is returned to zero. The general object of the invention is to produce a simple machine of this kind having means for disconnecting the drive from the measuring roller to the indicating mechanism and also to provide a totalizer for indicating the total length of pieces measured, the totalizer being automatically disconnected from the drive connection when the indicating mechanism is being returned to zero. One of the objects has been to provide improved means for stopping the indicating mechanism at zero and at the limit or maximum measuring movement of the machine. Further objects have been to provide automatic means for raising the presser roller and for effecting the disconnection of the drive to the indicating mechanism when the marking means is operated which marks the point where the measured piece is to cut off.

Further objects of the invention will appear hereinafter.

The invention consists in the novel features, and in the general combination of parts to be particularly described hereinafter, all of which contribute to produce a simple and efficient fabric measuring machine. A preferred embodiment of the invention will be particularly described in the following specification, while the broad scope of the invention will be pointed out in the appended claims.

In the drawing;

Figure 3 is an end elevation of the mechanism with the casing or case removed;

Figure 4 is a plan of the machine shown in Figure 3;

Figure 5 is a cross section taken on the line 5—5 of Figure 4, but omitting some parts;

Figure 6 is a side elevation as viewed from the left of Fig. 3 particularly illustrating the driving train or drive connection through which the indicating mechanism and the totalizer are actuated from the measuring roller;

Figure 7 is a vertical section taken on the line 7—7 of Figure 6, further illustrating details of the driving connection or gear train; this view shows the driving connection in its open condition; and Figure 8 is an elevation showing the gearing illustrated in Figure 7, but showing the gears in mesh as when the driving connection is closed.

Figure 1:
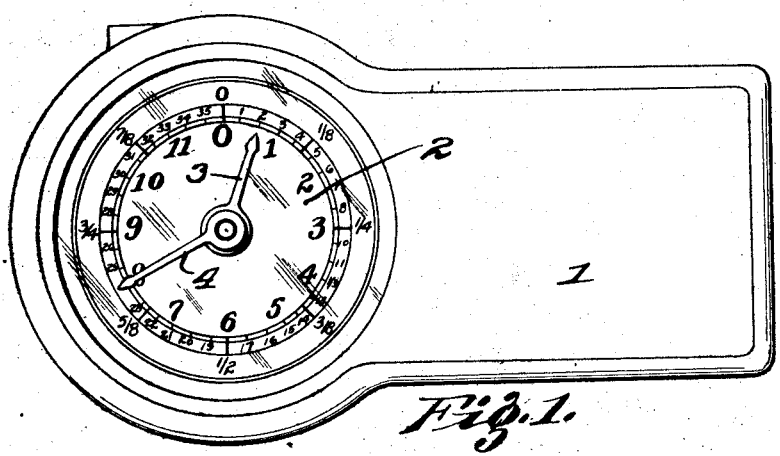
Figure 1 is a plan of a machine embodying the invention.

Referring more particularly to the parts, 1 represents a casing, one end of which is provided with an indicating dial 2 carrying large numbers indicating yards up to 12 and small numbers indicating inches up to 36. The indicating mechanism includes a slow moving pointer or hand 3 which indicates yards and a fast moving pointer which indicates inches.

In the lower portion of the casing a measuring roller 5 is mounted to rotate on a horizontal axis, being supported at its inner end on a vertical frame plate 6 through which the shaft 7 of the measuring roller extends.

Co-operating with this measuring roller there is provided a presser roller 8 (see Fig. 5) which is carried on a movable presser roller frame 9 which is of bifurcated form comprising two arms 10 which are mounted to rock on a pivot bar 11. (See Fig. 4). The arms 10 are connected integrally by the main part or bar 12 of this frame which extends longitudinally with the axis of the presser roller. A spring 13 is provided which presses down upon the bar 12 of the presser roller frame to force the presser roller toward the measuring roller.

Figure 2:
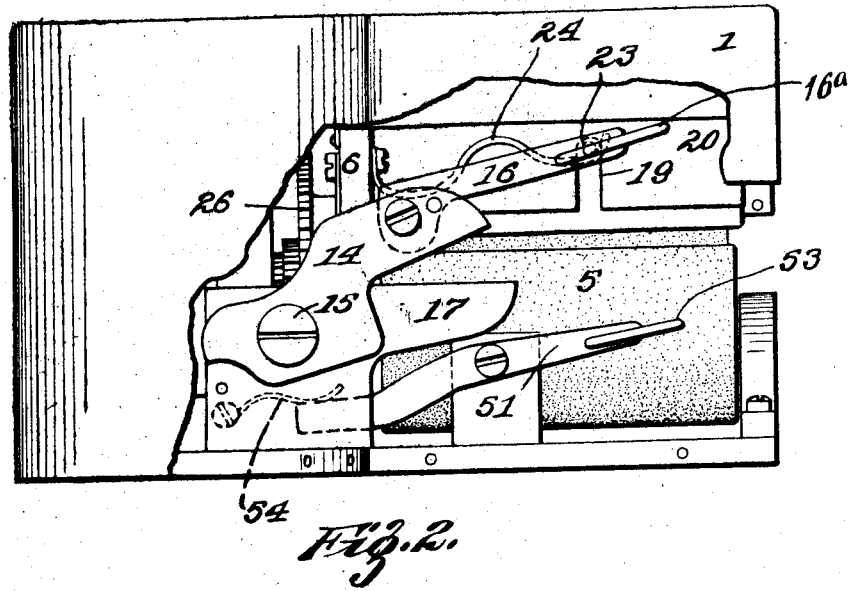
Figure 2 is a side elevation partially broken away to indicate details of construction.

The machine is provided with marking means which may consist of a knife or blade 14 pivoted at 15 and operated by a hand-actuated knife lever or hand lever 16, the knife 14 co-operating with a fixed knife or blade 17. (See Fig. 2). This lever 16 has means for operating it from the exterior of the casing. A connection is provided between this knife lever 16 and the presser roller frame, operating to raise the presser roller frame when the knife lever 16 is actuated or lowered. For this purpose, the inner side of the lever 16 is provided with a slot 18 (Figs. 4 and 5) which lies opposite a vertical slot 19 formed in a forward frame plate 20 of the machine. The hand lever has a thumb-plate 16a for operating it. On the rear face of the frame plate 20 a lever 21 is pivoted at 22 (see Fig. 4) and the outer end of this lever carries a pin 23 which projects through the slot 19 and into the slot 18 of the lever 16 (see Fig. 4); lever 21 has a slot 21a receiving a projecting part or pin 9a on bar 12 of the presser roller frame 9. When the lever 21 is actuated by the knife lever 16 in being lowered, evidently the presser roller frame 9 will be raised. A spring 24 (Figs. 2 and 4) is provided which engages pin 23, and this spring operates to normally hold the lever 16 elevated and the presser roller frame 9 depressed.

A driving connection is provided from the measuring roller 5 to the indicating mechanism, (including the hands 3 and 4), and provision is made for opening this driving connection automatically when the lever 16 is actuated or depressed. For this purpose the shaft 7 of the measuring roller carries a pinion 25 (Figs. 7 and 8); this pinion operates to drive a relatively fixed gear wheel 26 through the medium of a relatively movable gear wheel 27 which operates as an idler between the gears 25 and 26. The gear wheels 26 and 27 constitute a clutch which is held closed when the measuring operation is taking place. In order to enable the relatively movable gear 27 to be separated from the gear 26, the same is mounted upon a rocking plate 28 (see Figs. 7 and 8), one end of which is connected by a link 29 (see Fig. 7) with the inner end of the aforesaid bar 12 which extends through a slot 30 in the frame plate 6. In order to permit the necessary freedom of movement of the bar 12 in raising the presser roller frame, a lost motion connection is provided between the link 29 and the rocking plate, which may simply be in the form of a slot 31 (Fig. 8) through which a pin or screw 32 passes. With this construction it is evident that when the link 29 is pulled upwardly, as it will be when the knife lever 16 is depressed, the gears 26 and 27 will be separated; this opens the driving connection from the measuring roller. A coil-spring 28a pulls the rocking-plate 28 in a direction to close this driving connection. When this connection is open the indicating mechanism is returned to zero by suitable means which will now be described.

The large gear wheel 26 (see Fig. 3) carries a small bevel pinion 33 which meshes with a large bevel gear 34 rigid on the underside of a pinion 35 which meshes with a large gear wheel 36 carrying a pinion 37 meshing with a large gear wheel 38 (see Fig. 4) which carries the slow moving hand or pointer 3. The pinion 35 drives the fast moving pointer 4. It should be understood that the gearing just described merely operates as back gearing or reducing gearing to drive the hand 3 to indicate yards, while the hand 4 is indicating inches. In order to return the indicating mechanism to zero a coil spring 39 is provided (see Fig. 4); its outer end being secured to the upper end of a fixed bracket 40 (see Figs. 3 and 4), and the inner end of which is attached to a shaft 41 which carries the gear 36 and the pinion 37. When the clutch 26, 27 is opened, evidently this spring will operate to rotate the indicating mechanism and return the same to zero.

Special means is provided for stopping the indicating mechanism with the hands 3 and 4 at the zero position and this same means is constructed in such a way that it will also operate to stop the hands in this same position at the limit or maximum measuring movement of the hands, that is to say, twelve yards. For this purpose a stop is provided on the wheel 38 co-operating with a relatively fixed stop, and one of these stops is constructed so that it may have a limited movement. In order to accomplish this, the gear wheel 38 is provided with a pin or stop 42 (Fig. 4), and projecting into the path of this stop there is provided a stop in the form of a finger 43 projecting from a small plate 44 pivoted at 45; this plate may have a slight lateral movement by reason of a slot 46 through which a screw or pin 47 passes; gear wheel 38 moves clockwise when cloth is being measured, and contra-clockwise when spring 39 is restoring it to zero; this view shows the gear wheel 38 in its zero position, that is to say, in the position which it has when the two hands 3 and 4 are at zero. When the maximum measurement has been made the stop pin 42 will have made one complete revolution and come against the opposite side of the finger or stop 43. Before the finger 43 arrests the wheel 38 however, it will have been moved in a downward direction as viewed in Figure 4 and the slot 46 is long enough to permit sufficient movement to stop the pin 42 in the same position which it has when the hands are at zero.

Suitable latching means is provided for latching the clutch 26, 27 open and for holding the presser roller frame raised to hold the presser roller 8 away from the measuring roller. For this purpose a latch or pawl 48 is pivotally mounted on the frame plate 6 (see Fig. 7) and when the link 29 is raised, a dog 49 on the side of this link passes above the upper edge of the detent pawl 48; the spring 50 of the detent pawl then pushes the pawl in under the dog 49 and holds the link in this position. Hand operated means is provided for releasing the pawl at will. For this purpose there is provided a releasing lever 51 (see Fig. 2) which is preferably mounted near the knife lever 16 and the end of this lever lies adjacent to an inclined edge 52 formed at the lower end of the pawl 48 (see Fig. 7). The thumb plate 53 of this lever is normally held elevated by a small spring 54 which engages the upper edge of the end of the lever which is adjacent to the pawl 48.

A totalizer 55 is provided for indicating the total length of pieces measured on the machine and the rocking plate 28 operates to disconnect the drive to this totalizer so that the totalizer does not interfere in any way with returning the indicating mechanism to zero. The drive to the totalizer is effected by means of a small pinion 56 (Figs. 7 and 8) which is rigid with the gear wheel 27, that is to say it is also carried by the clutch plate or rocking plate 28; it is therefore relatively movable with respect to a relatively fixed gear 57 with which it meshes when the clutch 26, 27 is closed. This gear wheel 57 carries a rigid pinion 58 which is in mesh with a gear wheel 59 which drives an eccentric 60 attached to the shaft 61 of this gear 59. This eccentric 60 is connected by a link 62 (Fig. 3) with an arm 63 which actuates the dials of the totalizer.

It is understood, of course, that the casing is cut away opposite the levers 16 and 51 to permit their operation from the exterior.

The mode of operation of the entire machine will now be briefly described;

The indicating mechanism being in the zero position and the presser roller 8 in the raised position (see Fig. 5), the operator introduces the forward edge of the fabric into the space between the measuring roller 5 and the presser roller 8 and adjusts the fabric so that its forward edge is substantially in alignment with the blades 14 and 17. The lever 51 is then actuated, operating through the medium of the inclined edge 52 (Fig. 7) to release the pawl 48 which permits the spring 24 to to force the link 29 downwardly and likewise force the presser roller frame 9 downwardly until the roller 8 comes against the fabric on the measuring roller. The operator then pulls the fabric through the machine. This operates to drive the gear train 25, 27, 26 which drives the bevel gears 33 and 34 (Fig. 3). Through the back gearing 35, 36, 37 and 38, these gears operate to drive the hands 3 and 4. When the required amount of fabric has been measured, the operator presses down on the knife lever 16 so as to mark or cut the edge of the fabric which lies between the knives 14 and 17. Actuating the lever 16 rocks the rocking plate 28 and opens the clutch 26, 27 through which the indicating mechanism is driven and also opens the clutch 56, 57 (Fig. 7) through which the totalizer is driven. As soon as these clutches are open the spring 39 (Fig. 4) operates to return the indicating mechanism to zero by moving gear wheel 38 contra-clockwise.

As the indicating mechanism arrives at zero, the pin 42 comes against the side of the stop 43, and this stops the hands in the zero position. In the measuring movement, if the machine has measured its maximum, that is 12 yards, the pin 42 will strike against the upper edge of the finger 43, as viewed in Figure 4, and gives the finger a slight movement in the same direction with the pin, and the finger will eventually stop the pin 42 in substantially the same position in which it is indicated in Figure 4; that is to say, the stops 42 and 43 co-operate to stop the hands in the zero position and also in the 12 yard position.

It is understood that the embodiment of the invention described herein is only one of the many embodiments the invention may take, and I do not wish to be limited in the practice of my invention nor in my claims, to the particular embodiment set forth.

What I claim and desire to secure by Letters Patent is:—

1. In a machine of the kind described, the combination of a casing, a measuring roller, indicating mechanism, a clutch for actuating the same from the roller, a hand actuated lever having means for operating the same from the exterior of the casing, a blade carried thereby for marking the fabric, for marking the point where the measured fabric is to be cut off, a presser roller mounted to move toward or from the measuring roller, means actuated by the marking means for opening the clutch and for raising the presser roller away from the measuring roller, and means for returning the indicating mechanism to zero when the clutch is open.

2. In a machine for measuring fabrics, the combination of a measuring roller, a presser roller co-operating therewith, indicating mechanism for indicating the length of a piece of fabric measured, a totalizer for indicating the total lengths of the pieces measured, a driving connection from the measuring roller for driving the totalizer and the indicating mechanism, a hand-actuated lever with marking means for marking the point where the fabric is to be cut off, means actuated thereby for opening said driving connection to disconnect the indicating mechanism from the measuring roller and from the totalizer, and means for returning the indicating mechanism to zero when the driving connection is open.

3. In a machine for measuring fabrics, the combination of a measuring roller, a presser roller co-operating therewith, a presser roller frame carrying the presser roller and mounted to move toward or from the measuring roller, indicating mechanism for indicating the length of a piece of fabric measured, a totalizer for indicating the total lengths of the pieces measured, a driving connection from the measuring roller for driving the totalizer and the indicating mechanism, a hand actuated knife lever for marking the edge of the fabric where it is to be cut off, means actuated thereby for raising the presser roller frame, a latch pawl for latching the presser roller frame raised to hold the presser roller away from the measuring roller, means also actuated by the knife lever for opening the driving connection to disconnect the indicating mechanism from the measuring roller and from the totalizer, and means for returning the indicating mechanism to zero when the driving connection is open.

4. A machine constructed as described in claim 3 in combination with a hand-operated lever adjacent the knife lever for releasing the latching means, and a spring acting upon the presser roller frame to rock the same and force the presser roller against the measuring roller.

5. In a machine for measuring fabrics, the combination of a measuring roller, a presser roller co-operating therewith, a presser roller frame carrying the presser roller and mounted to move toward or from the measuring roller, indicating mechanism for indicating the length of a piece of fabric measured, a driving connection including a relatively fixed gear and a relatively movable gear, a rocking plate carrying the relatively movable gear for moving the same into or out of mesh with the relatively fixed gear, said rocking plate mounted to rock on the axis of the shaft of the measuring roller, a pinion rigid with the measuring roller and meshing with the relatively movable gear for driving the same, a hand-actuated knife lever having means for operating the same from the exterior of the casing for marking the edge of the fabric where it is to be cut off, means actuated thereby for raising the presser roller frame, means also actuated thereby for rocking the rocking plate to separate the relatively movable gear from the relatively fixed gear, and thereby disconnect the driving connection from the measuring roller and the indicating mechanism, and means for returning the indicating mechanism to zero.

6. In a machine for measuring fabrics, the combination of a measuring roller, a presser roller co-operating therewith, a presser roller frame carrying the presser roller and mounted to move toward or from the measuring roller, indicating mechanism for indicating the length of a piece of fabric measured, a driving connection including a relatively fixed gear and a relatively movable gear, a rocking plate carrying the relatively movable gear for moving the same into or out of mesh with the relatively fixed gear, said rocking plate mounted to rock on the axis of the shaft of the measuring roller, a pinion rigid with the measuring roller and meshing with the relatively movable gear for driving the same, a knife lever for marking the edge of the fabric where it is to be cut off, means actuated thereby for raising the presser roller frame, means also actuated thereby for rocking the rocking plate to separate the relatively movable gear from the relatively fixed gear, and thereby disconnect the driving connection from the measuring roller to the indicating mechanism, means for returning the indicating mechanism to zero, said indicating mechanism including a wheel adapted to make one revolution in the greatest possible measuring movement of the machine, a stop carried by said wheel and a relatively fixed stop co-operating therewith to stop the wheel at the limit of the measuring movement and at the zero position, one of said stops being mounted to permit a slight lateral movement operating to stop the wheel in substantially the same position at zero and at the limit of the measuring movement.

7. In a machine for measuring fabrics, the combination of a measuring roller, a presser roller co-operating therewith, a presser roller frame carrying the presser roller and mounted to move toward or from the measuring roller, indicating mechanism for indicating the length of a piece of fabric measured, a totalizer for indicating the total lengths of the pieces measured, a driving connection from the measuring roller for driving the totalizer and the indicating mechanism including a relatively fixed gear for driving the indicating mechanism and a relatively fixed gear for driving the totalizer, a rocking plate and relatively movable gears carried by the rocking plate for meshing with the first named gears respectively, means for driving the relatively movable gears from the measuring roller, a knife lever, means actuated thereby for raising the presser roller frame to move the presser roller away from the measuring roller, and means actuated thereby for moving the rocking plate to disconnect the movable gears from the other gears, and means for returning the indicating mechanism to zero when the movable gears are separated from their corresponding relatively fixed gears.

8. In a machine of the kind described, the combination of a measuring roller, indicating mechanism actuated thereby, marking means for marking the fabric to indicate the point where it is to be cut off, and means for effecting the return of the indicating mechanism to zero, controlled by the actuation of the marking means.

9. In a machine of the kind described, the combination of a measuring roller, indicating mechanism, driving mechanism including a clutch through which the measuring roller actuates the indicating mechanism, marking means for marking the fabric to indicate the point where it is to be cut off, means actuated thereby for opening the clutch, and means for returning the indicating mechanism to zero when the clutch is open.

10. In a machine of the kind described, the combination of a measuring roller, indicating mechanism, driving mechanism including a clutch through which the measuring roller actuates the indicating mechanism, marking means including a lever for marking the fabric to indicate the point where it is to be cut off, means actuated by said lever for opening the clutch, and means for returning the indicating mechanism to zero when the clutch is open.

11. In a machine of the kind described, the combination of a casing, a measuring roller, indicating mechanism, a hand actuated lever having means for marking the point where the measured fabric is to be cut off, a clutch for actuating the indicating mechanism from the measuring roller, a presser roller frame mounted to move toward or from the measuring roller, a presser roller carried thereby, means actuated by the hand actuated lever for opening the clutch and for moving the presser roller frame to hold the presser roller away from the measuring roller, and means for returning the indicating mechanism to zero when the clutch is open.

12. In a machine of the kind described, the combination of a measuring roller, a presser roller movable toward and from the measuring roller and co-operating therewith, latching means for holding the presser roller in a raised position removed from the measuring roller, indicating mechanism, driving mechanism including a clutch through which the measuring roller actuates the indicating mechanism, marking means for marking the fabric to indicate the point where it is to be cut off, means for opening the clutch actuated by the marking means, means for returning the indicating mechanism to zero when the clutch is open, and means actuated by the marking means for raising the presser roller to enable the latching means to hold the same away from the measuring roller.

ANNIE MAE HOSCH,
*Administratrix for Walter E. Hosch, deceased.*